(12) United States Patent
Yu

(10) Patent No.: US 10,233,864 B2
(45) Date of Patent: Mar. 19, 2019

(54) PISTON AND ENGINE PROVIDED WITH THE SAME

(71) Applicants: HYUNDAI MOTOR COMPANY, Seoul (KR); KIA MOTORS CORPORATION, Seoul (KR)

(72) Inventor: Seungeun Yu, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/829,122

(22) Filed: Dec. 1, 2017

(65) Prior Publication Data

US 2019/0032596 A1    Jan. 31, 2019

(30) Foreign Application Priority Data

Jul. 28, 2017   (KR) .......................... 10-2017-0095873

(51) Int. Cl.
*F02F 3/28* (2006.01)
*F02F 3/24* (2006.01)

(52) U.S. Cl.
CPC ..................................... *F02F 3/24* (2013.01)

(58) Field of Classification Search
CPC ... F02F 3/24; F02F 3/28; F02B 23/101; F02B 23/0651; F02B 23/0678; F02B 2023/103
USPC ...................... 123/298, 307, 193.6
See application file for complete search history.

(56) References Cited

U.S. PATENT DOCUMENTS

| 4,281,629 | A  | * | 8/1981  | List ..................... | F02B 23/0627 |
|           |    |   |         |                         | 123/279      |
| 4,635,597 | A  | * | 1/1987  | Ohashi ................ | F02B 23/0651 |
|           |    |   |         |                         | 123/263      |
| 7,942,126 | B2 | * | 5/2011  | Zoller ................. | F02B 23/0651 |
|           |    |   |         |                         | 123/298      |
| 8,459,229 | B2 | * | 6/2013  | Rothbauer .......... | F02B 23/0651 |
|           |    |   |         |                         | 123/276      |
| 9,091,199 | B2 | * | 7/2015  | Straub ................ | F02B 17/005  |
| 9,279,361 | B2 | * | 3/2016  | Rothbauer ........... | F02F 3/26    |
| 9,670,826 | B2 | * | 6/2017  | Gabel ................. | F02B 23/0621 |
| 9,810,140 | B2 | * | 11/2017 | Lee .................... | F02B 23/0621 |
| 9,869,270 | B1 | * | 1/2018  | Anders ............... | F02B 23/0687 |
| 2005/0252483 | A1 | * | 11/2005 | Ganz ................... | F02B 17/00 |
|           |    |   |         |                         | 123/299      |
| 2007/0199538 | A1 | * | 8/2007  | Yuzaki ................ | F02B 23/0651 |
|           |    |   |         |                         | 123/276      |
| 2010/0206263 | A1 | * | 8/2010  | Hasegawa ........... | F02B 23/0651 |
|           |    |   |         |                         | 123/279      |
| 2015/0308371 | A1 | * | 10/2015 | Eismark ............. | F02B 23/0627 |
|           |    |   |         |                         | 123/193.6    |

FOREIGN PATENT DOCUMENTS

| JP | 2003-524111 A   | 8/2003  |
| JP | 3984908 B2      | 10/2007 |
| KR | 10-2000-0025210 A | 5/2000  |

* cited by examiner

*Primary Examiner* — Hai H Huynh
(74) *Attorney, Agent, or Firm* — Knobbe Martens Olson & Bear LLP

(57) ABSTRACT

A piston and an engine including the same are provided. The piston includes an upper surface that is formed at an upper portion; a bowl that is concavely formed at the upper surface; a plurality of protruding portions that are separated by a predetermined distance along an edge of the bowl; and a central portion that is protruded upward at the center of the bowl.

6 Claims, 5 Drawing Sheets

PISTON AND ENGINE PROVIDED WITH THE SAME

CROSS-REFERENCE TO RELATED APPLICATION

This application claims priority to and the benefit of Korean Patent Application No. 10-2017-0095873 filed in the Korean Intellectual Property Office on Jul. 28, 2017, the entire contents of which are incorporated herein by reference.

BACKGROUND (a) Field

The present disclosure relates to a piston and an engine including the same. More particularly, the present invention relates to a piston and an engine including the same that reduce fuel spray and flame overlapping.

(b) Description of the Related Art

Fuel that is ejected to a combustion chamber according to a driving condition of a vehicle may be ejected in various forms.

However, fuel spray and flame overlapping may occur according to a vehicle driving condition, and in a portion in which fuel or flame are overlapped, particulate matters (PM) occur.

Such PM occurrence may be replaced with PM reduction mapping, but when using PM reduction mapping, fuel consumption may be deteriorated.

Further, there is a method of mixing air/fuel using a swirl port, but a movement resistance may occur with application of the swirl port, and volume efficiency may be deteriorated due to intake resistance.

The above information disclosed in this Background section is only for enhancement of understanding of the background of the invention and therefore it may contain information that does not form the prior art that is already known in this country to a person of ordinary skill in the art.

The disclosure of this section is to provide background of the invention. Applicant notes that this section may contain information available before this application. However, by providing this section, Applicant does not admit that any information contained in this section constitutes prior art.

SUMMARY

The present invention has been made in an effort to further provide a piston and an engine including the same having advantages of being capable of reducing intake resistance through a guide shape of sprayed fuel.

An embodiment of the present invention provides a piston including an upper surface that is formed at an upper portion; a bowl that is concavely formed at the upper surface; a plurality of protruding portions that are separated by a predetermined distance along an edge of the bowl; and a central portion that is protruded upward at the center of the bowl.

The each protruding portion may include a first guide surface that is inclined to flow the fuel in one direction; and a second guide surface that is inclined in an opposite direction of the first guide surface, wherein a cross-section slope of a first guide surface of a vertical direction of the piston may be more gently than that of a second guide surface of a vertical direction of the piston.

A recess portion for guiding upward fuel that is moved along the first guide surface may be formed between the each protruding portion.

At a boundary of the bowl and the upper surface, a protruding portion lip corresponding to the protruding portion and a recess portion lip corresponding to the recess portion may be formed, but a length from the center of the bowl to the protruding portion lip may be longer than that from the center of the bowl to the recess portion lip.

A length from the center of the bowl to the protruding portion lip may be 0.95 times to 1.0 times larger than that from the center of the bowl to an uppermost portion of the protruding portion.

A length from the center of the bowl to the recess portion lip may be 0.8 times to 0.9 times larger than that from the center of the bowl to an endmost portion of the recess portion.

A height of the recess portion lip may be 1.5 times or less larger than that of the protruding portion lip.

Another embodiment of the present invention provides an engine including an injector in which a plurality of injector holes are radially and downwardly formed; and a piston in which a plurality of protruding portions are formed to flow in one direction fuel that is ejected from the injector hole.

The each protruding portion may include a first guide surface that is inclined to flow the fuel in one direction; and a second guide surface that is inclined in an opposite direction of the first guide surface, but a cross-section slope of a first guide surface of a vertical direction of the piston may be more gently than that of a second guide surface of a vertical direction of the piston.

At the piston head, an upper surface may be formed, and a bowl may be formed concavely from the upper surface, and the each protruding portion may be separated by a predetermined distance along an edge of the bowl.

A recess portion for guiding upward fuel that is moved along the first guide surface may be formed between the each protruding portion.

At a boundary of the bowl and the upper surface, a protruding portion lip corresponding to the protruding portion and a recess portion lip corresponding to the recess portion may be formed, but a length from the center of the bowl to the protruding portion lip may be longer than that from the center of the bowl to the recess portion lip.

A length from the center of the bowl to the protruding portion lip may be 0.95 times to 1.0 times larger than that from the center of the bowl to an uppermost portion of the protruding portion.

A length from the center of the bowl to the recess portion lip may be 0.8 times to 0.9 times larger than that from the center of the bowl to an endmost portion of the recess portion.

A height of the recess portion lip may be 1.5 times or less larger than that of the protruding portion lip.

By a piston and an engine including the same according to an embodiment of the present invention, fuel spray and flame overlapping can be avoided.

Further, by a piston and an engine including the same according to an embodiment of the present invention, intake resistance can be reduced through a guide shape of sprayed fuel.

DETAILED DESCRIPTION

Figure 1:
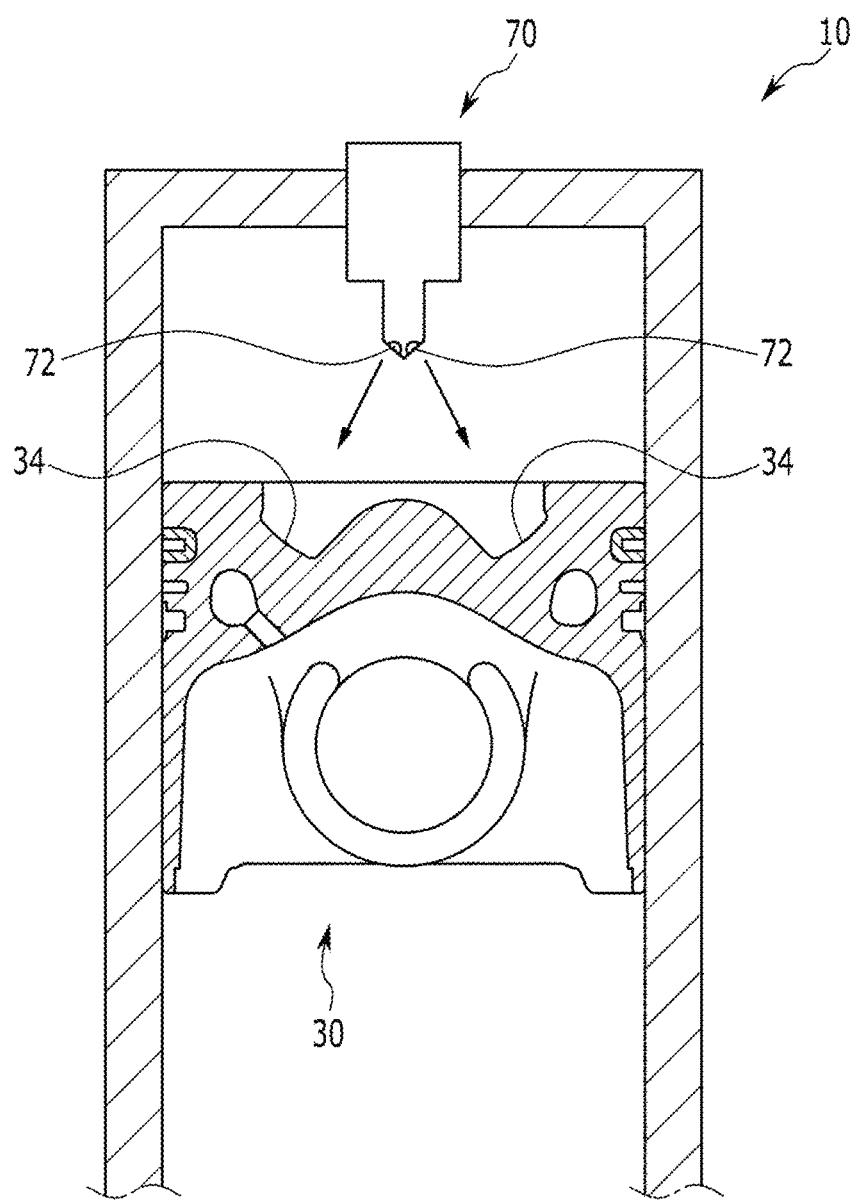
FIG. 1 is a partially cross-sectional view of an engine including a piston according to an embodiment of the present invention.

In the following detailed description, embodiments of the present invention have been shown and described, simply by way of illustration.

As those skilled in the art would realize, the described embodiments may be modified in various different ways, all without departing from the spirit or scope of the present invention Like reference numerals designate like elements throughout the specification.

In the drawings, the thickness of layers, films, panels, regions, etc., may be exaggerated for clarity.

When it is said that any part, such as a layer, film, region, or plate, is positioned on another part, it means the part is directly on the other part or above the other part with at least one intermediate part.

In contrast, when an element is referred to as being "directly on" another element, there are no intervening elements present.

In addition, in the specification, unless explicitly described to the contrary, the word "comprise" and variations such as "comprises" or "comprising", will be understood to imply the inclusion of stated elements but not the exclusion of any other elements.

Embodiments of the present invention will hereinafter be described in detail with reference to the accompanying drawings.

Figure 2:
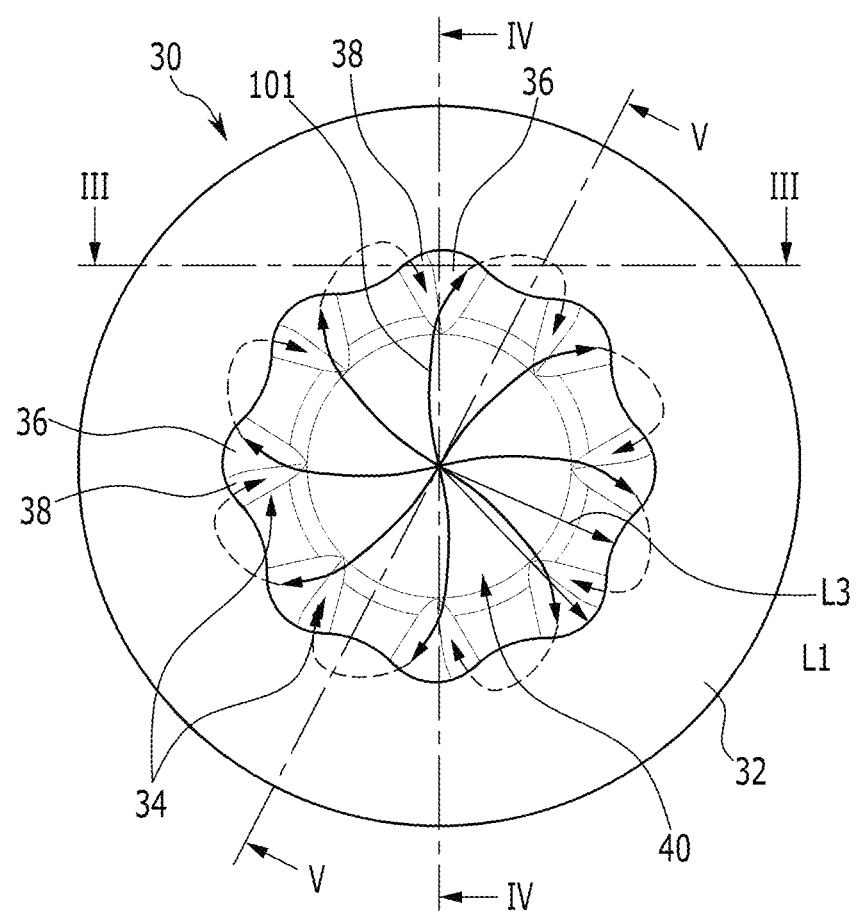
FIG. 2 is a top plan view of a piston according to an embodiment of the present invention.

According to an aspect of the invention, a vehicle engine including a piston head that has a recess at its top surface is disclosed. The pistol head has a top flat surface facing a fuel sprayer 70, 72 inside a cylinder of a vehicle engine 10. The piston head 30 includes a recess 50 formed at a central portion of the top flat surface. Inside the recess, the piston head has a central protrusion 40 protruding toward the fuel sprayer. When viewed over the top, a plurality of peripheral protrusions 34 are formed inside the recess around the central protrusion 40 for guiding fuel injected into the recess. As each of the peripheral protrusions 40 is not in a symmetrical shape and has two top surfaces 36, 38 slanted in different angles against an axis of piston movement, flow of fuel from the fuel sprayer 72 form a swirl inside the recess when view over the top as illustrated in FIG. 2. A symmetrical shape of the peripheral protrusions 40 cause a tumble flow of the fuel from bottom of the recess toward the opening of the recess along a side wall of the recess for reducing overlapping of fuel spray and flame over the piston head.

Figure 3:
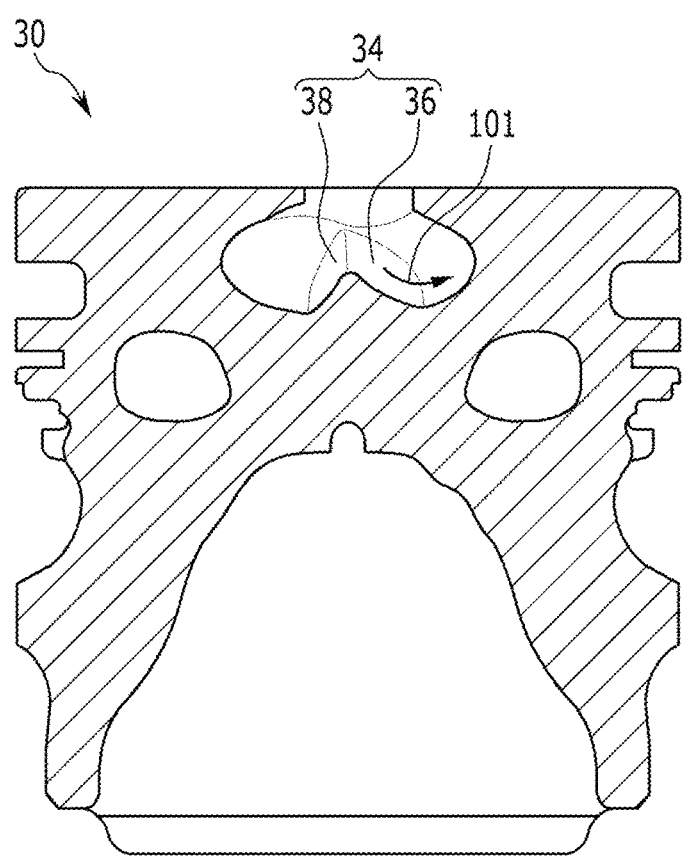
FIG. 3 is a cross-sectional view of the piston taken along line III-III of FIG. 2.
Figure 4:
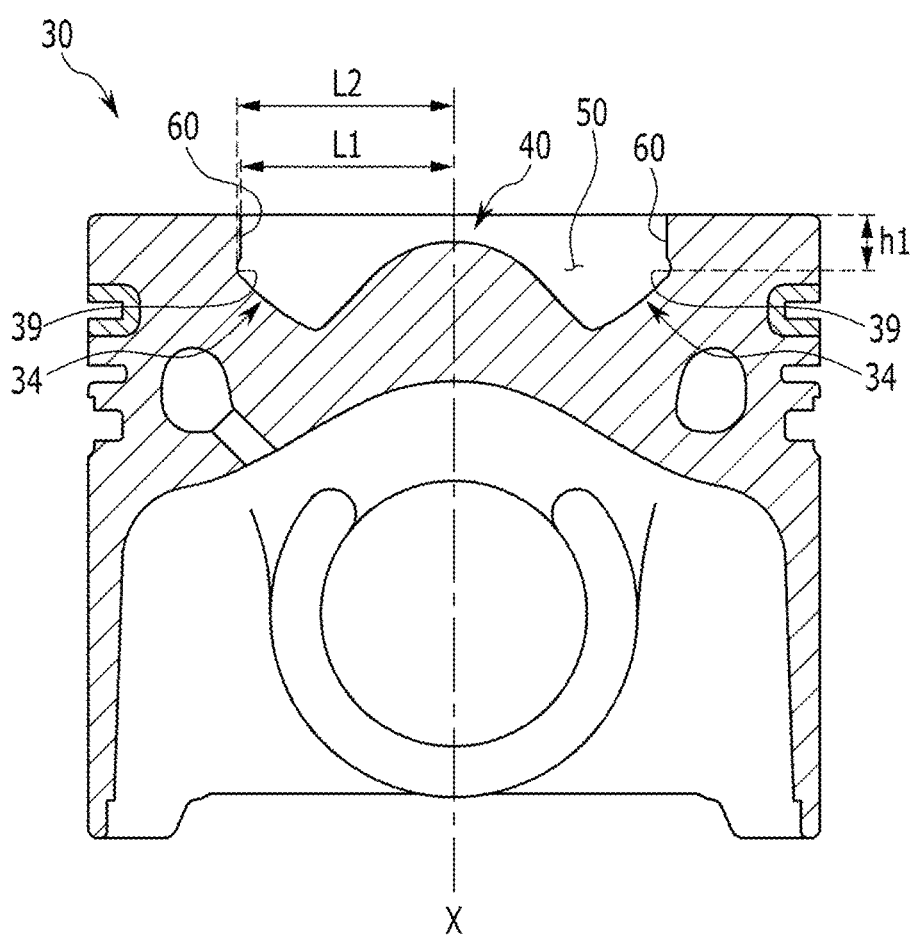
FIG. 4 is a cross-sectional view of the piston taken along line IV-IV of FIG. 2.
Figure 5:
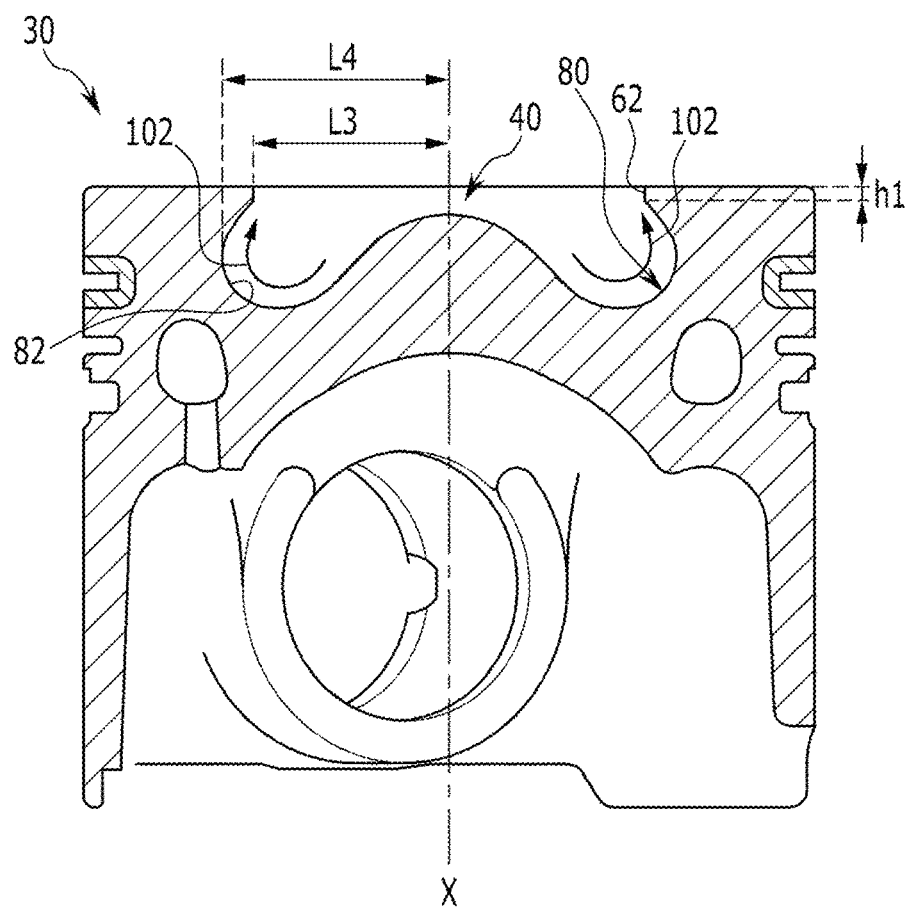
FIG. 5 is a cross-sectional view of the piston taken along line V-V of FIG. 2.

FIG. 1 is a partially cross-sectional view of an engine including a piston according to an embodiment of the present invention, and FIG. 2 is a top plan view of a piston according to an embodiment of the present invention, FIG. 3 is a cross-sectional view of the piston taken along line III-III of FIG. 2, FIG. 4 is a cross-sectional view of the piston taken along line IV-IV of FIG. 2, and FIG. 5 is a cross-sectional view of the piston taken along line V-V of FIG. 2.

Referring to FIGS. 1 to 5, an engine 10 according to an embodiment of the present invention includes an injector 70 in which a plurality of injector holes 72 are radially and downwardly formed and a piston 30 in which a plurality of protruding portions 34 are formed to flow in one direction fuel that is ejected from the injector hole 72.

The piston 30 according to an embodiment of the present invention may include an upper surface 32 that is formed in an upper portion, a bowl 50 that is concavely formed at the upper surface, and a central portion 40 that is protruded upward at the center of the bowl 50, and the plurality of protruding portions 34 are separated by a predetermined distance along an edge of the bowl 50.

As shown in FIG. 3, the each protruding portion 34 includes a first guide surface 36 that is inclined to flow the fuel 101 in one direction and a second guide surface 38 that is inclined in an opposite direction of the first guide surface 36. A cross-section slope of the first guide surface 36 of a vertical direction of the piston 30 may be more gently than that of the second guide surface 38 of a vertical direction of the piston 30.

As shown in FIGS. 1 and 2, fuel is ejected from the each injector hole 72 toward each protruding portion 34, and the ejected fuel 101 is guided and flowed along the first guide surface 36. The ejected fuel may flow clockwise based on an upper portion of the piston 30, as shown in FIG. 2, but it is not limited thereto and the ejected fuel may be inducted counterclockwise according to a forming direction of the first guide surface 36, It is shown that 8 protruding portions 34 are formed to correspond to ejecting injector holes, but the present invention is not limited thereto and various numbers of protruding portions may be formed to correspond to the formed injector holes.

Smooth swirl of ejected fuel 101 is available according to guide of ejection fuel by the protruding portion 34, and ejected fuel 101 can be prevented from being overlapped.

By swirl by the protruding portion 34, an additional swirl forming at an intake port would be unnecessary, and thus intake efficiency may be increased.

A recess portion 80 for guiding upward fuel that is moved along the first guide surface 36 may be formed between the each protruding portion 34.

At a boundary of the bowl 50 and the upper surface 32, a protruding portion lip 60 corresponding to the protruding portion 34 and a recess portion lip 62 corresponding to the recess portion 80 are formed.

The protruding portion lip 60 and the recess portion lip 62 may be defined to a constant plane that contacts the upper surface 32.

A length L1 from the center X of the bowl 50 to the protruding portion lip 60 may be longer than a length L3 from the center X of the bowl 50 to the recess portion lip 62, A length L1 from the center X of the bowl 50 to the protruding portion lip 60 may be 0.95 times and 1.0 times larger than a length L2 from the center X of the bowl 50 to an uppermost end 39 of the protruding portion 34.

A length L3 from the center X of the bowl 50 to the recess portion lip 62 may be 0.8 times and 0.9 times larger than a length L4 from the center X of the bowl 50 to an endmost portion 82 of the recess portion 80.

A height h1 of the recess portion lip 62 may be 1.5 times or less larger than a height h2 of the protruding portion lip 60.

Fuel 101 that is ejected to the each protruding portion 34 is moved along the first guide surface 36, rotates along the round-shaped recess portion 80, and moves again along the second guide surface 38.

Because a cross-section slope of the second guide surface 38 of a vertical direction of the piston 30 is formed more sharply than that of the first guide surface 36 of a vertical direction of the piston 30, fuel 102 that is rotated along the recess portion 80 may move upward along the second guide surface 38.

A tumble movement may be reinforced by a shape of the central portion 40, the protruding portion lip 60 and the recess portion lip 62.

That is, by a shape of the protruding portion 34, the recess portion 80, the central portion 40, the protruding portion lip 60, and the recess portion lip 62, a swirl movement (referring to 101 in FIG. 2) and a tumble movement (referring to 102 in FIG. 102) may be reinforced.

As described above, by a piston and an engine according to an embodiment of the present invention, fuel spray and flame overlapping can be avoided and intake resistance can be reduced.

While this invention has been described in connection with embodiments of the present invention, it is to be understood that the invention is not limited to the disclosed embodiments. On the contrary, it is intended to cover various modifications and equivalent arrangements included within the spirit and scope of the appended claims.

DESCRIPTION OF SYMBOLS

| | |
|---|---|
| 10: engine | 30: piston |
| 32: upper surface | 34: protruding portion |
| 36: first guide surface | 38: second guide surface |
| 40: central portion | 50: bowl |
| 60: protruding portion lip | 62: recess portion lip |
| 70: injector | 72: injector hole |
| 80: recess portion | |

What is claimed is:

1. A piston, comprising:
    an upper surface that is formed at an upper portion;
    a bowl that is recessed from the upper surface;
    a central portion that is protruded upward at the center of the bowl;
    a plurality of protruding portions that are separated by a predetermined distance along an edge of the bowl, wherein each of the protruding portions comprises a first guide surface that is inclined to flow fuel in a first direction, and a second guide surface that is inclined in a second direction opposite to the first direction, wherein a cross-sectional slope of the first guide surface in a cross-section taken in a vertical direction of the piston is more gentle than that of a second guide surface in the cross-section taken in the vertical direction of the piston; and
    a recess portion formed between two of the plurality of protruding portions, the recess portion being configured to guide fuel upwardly,
    wherein the bowl comprises a plurality of protruding portion lips and a recess portion lip at a boundary of the bowl, each protruding portion lip being formed between one of the plurality of protruding portions and the upper surface, the recess portion lip being formed between the recess portion and the upper surface,
    wherein a distance between the center of the bowl and the protruding portion lip is longer than that between the center of the bowl and the recess portion lip,
    wherein a height of the recess portion lip is 1.5 times or less larger than that of the protruding portion lip.

2. The piston of claim 1, wherein a length from the center of the bowl to the protruding portion lip is 0.95 times to 1.0 times larger than that from the center of the bowl to an uppermost portion of the protruding portion.

3. The piston of claim 1, wherein a length from the center of the bowl to the recess portion lip is 0.8 times to 0.9 times larger than that from the center of the bowl to an endmost portion of the recess portion.

4. An engine, comprising:
    an injector in which a plurality of injector holes are radially and downwardly formed; and
    a piston comprising:
        an upper surface that is formed at an upper portion;
        a bowl that is recessed from the upper surface;
        a central portion that is protruded upward at the center of the bowl;
        a plurality of protruding portions that are separated by a predetermined distance along an edge of the bowl, wherein each of the protruding portions comprises a first guide surface that is inclined to flow fuel in a first direction, and a second guide surface that is inclined in a second direction opposite to the first direction, wherein a cross-sectional slope of the first guide surface in a cross-section taken in a vertical direction of the piston is more gentle than that of a second guide surface in the cross-section taken in the vertical direction of the piston; and
        a recess portion formed between two of the plurality of protruding portions, the recess portion being configured to guide fuel upwardly,
        wherein the bowl comprises a plurality of protruding portion lips and a recess portion lip at a boundary of the bowl, each protruding portion lip being formed between one of the plurality of protruding portions and the upper surface, the recess portion lip being formed between the recess portion and the upper surface,
        wherein a distance between the center of the bowl and the protruding portion lip is longer than that between the center of the bowl and the recess portion lip,
        wherein a height of the recess portion lip is 1.5 times or less larger than that of the protruding portion lip.

5. The engine of claim 4, wherein a length from the center of the bowl to the protruding portion lip is 0.95 times to 1.0 times larger than that from the center of the bowl to an uppermost portion of the protruding portion.

6. The engine of claim 4, wherein a length from the center of the bowl to the recess portion lip is 0.8 times to 0.9 times larger than that from the center of the bowl to an endmost portion of the recess portion.

* * * * *